No. 741,703. PATENTED OCT. 20, 1903.
T. OLSEN.
TESTING MACHINE.
APPLICATION FILED MAR. 10, 1898.
NO MODEL. 5 SHEETS—SHEET 1.

Witnesses:
Inventor:
Tinius Olsen
by Homer A. Herr
atty

No. 741,703. PATENTED OCT. 20, 1903.
T. OLSEN.
TESTING MACHINE.
APPLICATION FILED MAR. 10, 1898.
NO MODEL. 5 SHEETS—SHEET 4.

Witnesses.
Inventor
Tinius Olsen
by Homer A. Herr
atty

No. 741,703. Patented October 20, 1903.

UNITED STATES PATENT OFFICE.

TINIUS OLSEN, OF PHILADELPHIA, PENNSYLVANIA.

TESTING-MACHINE.

SPECIFICATION forming part of Letters Patent No. 741,703, dated October 20, 1903.

Application filed March 10, 1898. Serial No. 673,380. (No model.)

*To all whom it may concern:*

Be it known that I, TINIUS OLSEN, a citizen of the United States of America, and a resident of the city and county of Philadelphia, State of Pennsylvania, have invented certain new and useful Improvements in Testing-Machines, of which the following is a specification.

My invention has reference to testing-machines; and it consists of features fully set forth in the following specification and accompanying drawings, forming part thereof.

The object of my invention is, first, to primarily sensitize the weighing-beam so it will respond quickly to any variations of stress which it will be called upon to register during the testing function. With this object in view I reduce the weight of the weighing-beam.

A second object of my improvement is to provide an instrument for a testing-machine to record distortion (either elongation or compression) of the specimen and to preserve the record of this distortion automatically and autographically.

That portion of my invention which relates to the means for sensitizing the weighing-beam and reducing the weight thereof consists in transferring all the parts which formerly were an operative part of the poise-moving portion of the weighing-beam to an independent support, and this independent support is made a portion of the framework itself. The net weight of the beam proper, therefore, is just sufficient to counterbalance the strains applied. The counterpoise for the weighing-beam can be replaced by a spring, thus reducing the weight of the movable parts to a minimum.

That portion of my invention which is designed to automatically and autographically register the distortion of the specimen consists of two pivoted calipering-arms having the line of their respective supporting-pivots on a common vertical plane, and this pivotal plane is parallel to the line of motion of the specimen during its distorting movement. Therefore when one end of the said calipering-arms are moved by reason of this contact with the moving specimen either in tension or compression the opposite end of the arms will move to a corresponding degree. This movement is independent of any bodily motion of the specimen. Combined with the upper calipering-arm and instrument is an electrical switch. This switch on being opened or closed operates a tap-bell. Each single tap of the bell indicates that the switch has been either opened or closed. This is accomplished by a light electrical current. The said bell in turn constitutes an electrical switch, opening or closing a stronger current through which is operated a magnetic clutch. This clutch communicates motion automatically to the instrument in such a manner that when the switch on the calipering-arm is open the magnetic clutch is operated and communicates motion thereby and therethrough to the instrument and adjusts it until the said calipering-arm switch is closed, which action makes the magnetic clutch inoperative until a further distortion of the specimen by the machine again opens the switch on the calipering-arm. This operation is repeated and continued for any length of time desired or until the specimen is broken and the distortion duly recorded. The mechanism operated and controlled by the magnetic clutch aside from the intermediate mechanical connections, which will be described more at length hereinafter, consists of a set of cog-wheels and two micrometer-screws primarily. By these screws the upper and lower caliper-arms are always maintained in an equidistant parallel horizontal plane. The movement of the micrometer-screws to maintain these arms in equidistant and parallel planes constitutes the degree of distortion, either tension or compression, of the specimen. Rings or proper heads are carried by the specimen in either test. In tension stresses, however, I place the fingers on the adjacent sides of the said rings or heads, and in compression tests I reverse the position of these fingers, placing the bottom finger against the upper ring or head on the upper side thereof and the upper finger against a stirrup which is connected to the lower ring or head.

In the drawings like parts are referred to by marks or figures of a corresponding kind in the different views.

2, a plan thereof; Fig. 3, a vertical longitudinal section through my magnetic clutch. In this view $m'$ is one of the line-circuits from battery to collector $m^5$; $m^4$, the circuit carrying current to magnet $O^2$, arrows $a'\ a''\ a'''$ showing the course of the current through the said magnet $O^2$, armature M, and magnet $O^3$ to collector $m^6$ and thence to line conductor $m$ to bell-tap and battery. Fig. 4 is an end view thereof. Fig. 17 is a detail showing the electrical connections of the tap-bell. Fig. 18 is a detail showing the manner in which the worm-wheel transmits motion to the shaft $70^3$.

Figure 1:
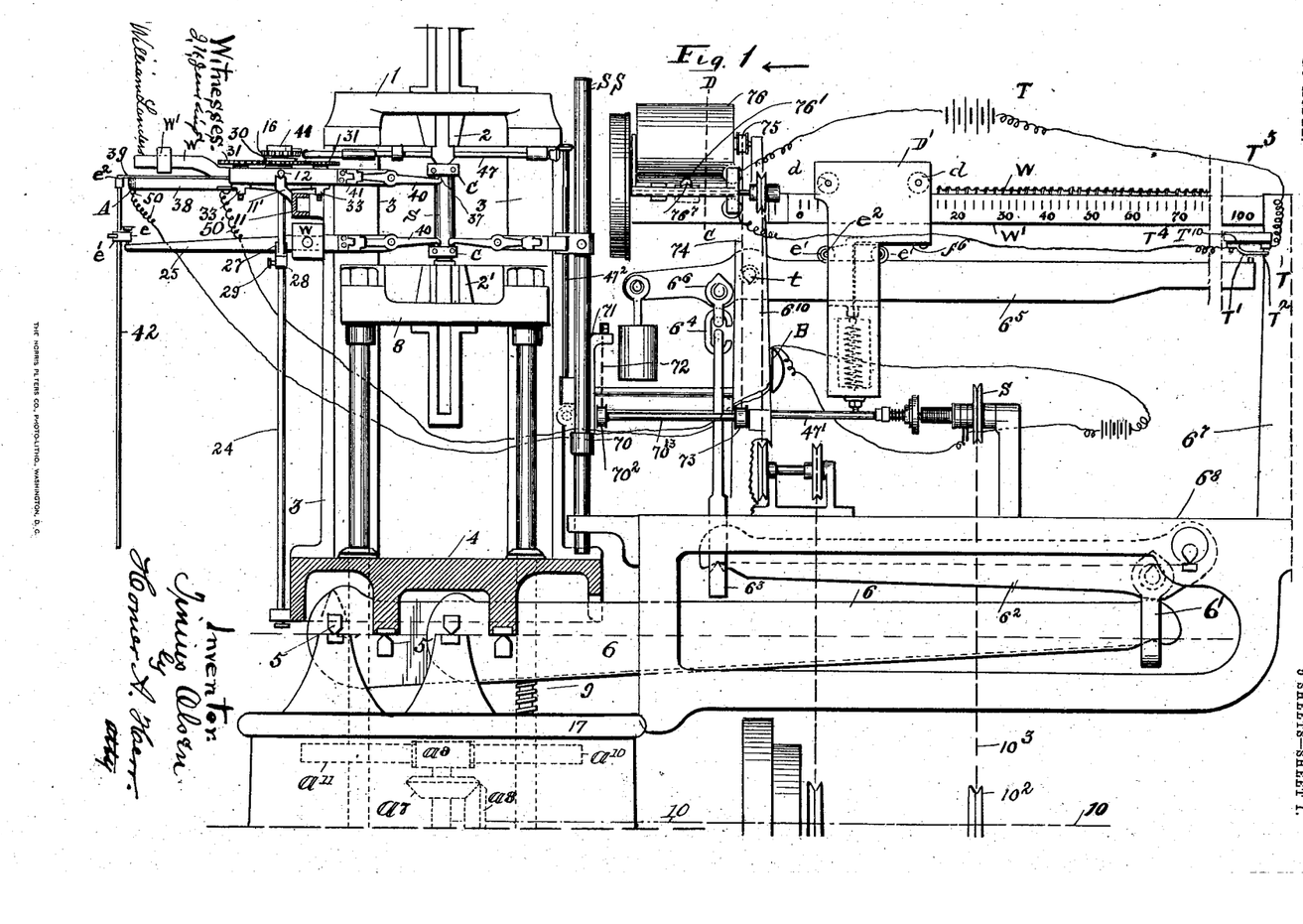
Figure 1 is a side elevation of a testing-machine having my improvement applied; Fig.

The general construction of the framework of the machine and of the force-multiplying levers from the counterpoise, also the screws for moving the testing-jaws, is old and shown in numerous of my former patents, and I do not, therefore, enter into a minute description thereof here. Suffice it, therefore, to say that 1 is the entablature supported on four columns 3 3 3 3, which columns in turn are carried by and fixed to the table 4, which rests on the knife-edge pivots 5 5 (only two of which are shown) of the primary force-multiplying levers 6. (See Fig. 1.) The levers 6, of which in practice there are two, as shown in Fig. 1, are supported by fulcrums resting on the base 7, as also shown in Fig. 1. A detail description of the knife-edges on which the base 4 rests and the pivotal supporting knife-edges carried by said levers and the supporting-fulcrums therefor is not thought necessary, as they are old and well known.

8 is a movable head containing the jaws adapted to grip the lower end of the specimen during tension tests. This head is moved upward and downward by the screws 9 9, of which there are four. This mechanism is actuated, and therethrough the aforesaid screws, by the prime shaft, whose center is indicated by the dotted line 10, Fig. 1. This shaft communicates motion in either tension or compression stresses to the screw 9 by the bevel $a^8$, $a'$, pinion $a^9$, and gears $a^{10}$ and $a^{11}$, the said gears being carried by the stress-inducing screws, one on each screw.

Figures 13, 14, 15:
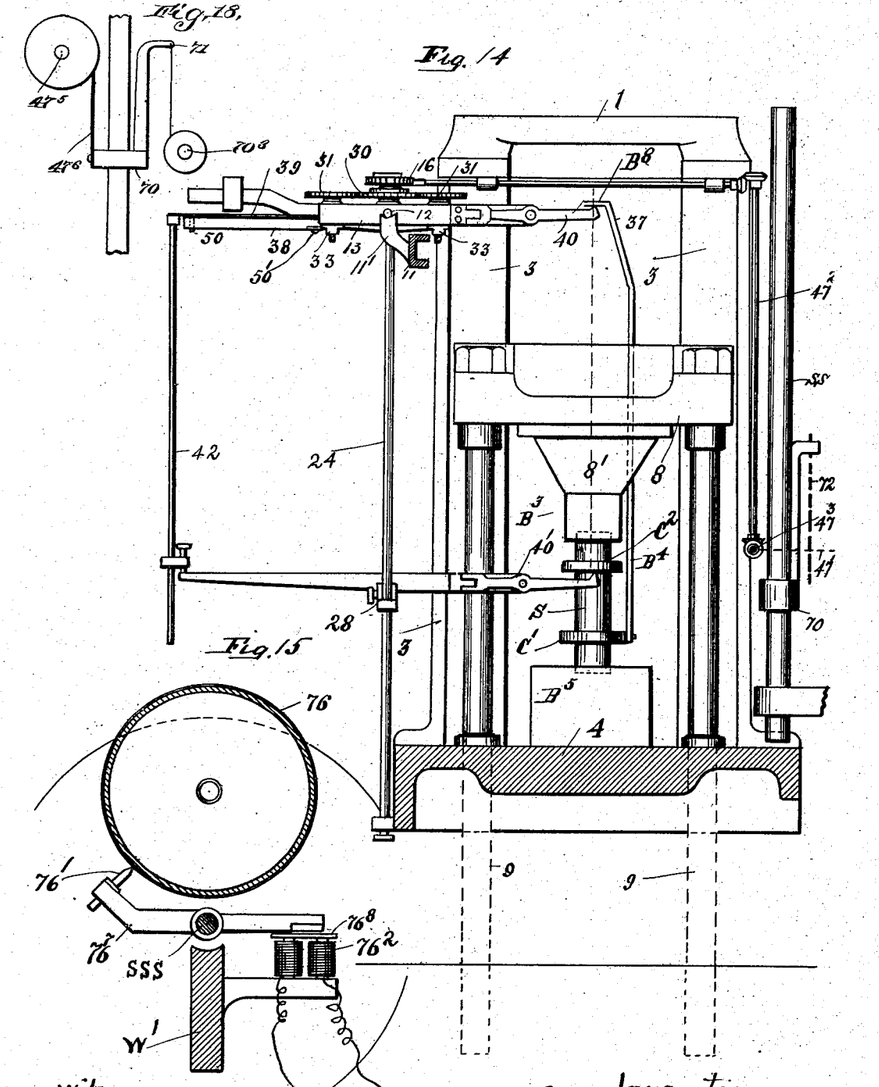
Fig. 14 is a side elevation of a portion of a testing-machine having my caliper-fingers in the position they should or could occupy during compression tests.
Fig. 15 is a transverse vertical section through the recording-drum, showing the paper-puncturing needle, magnets for actuating this needle, and battery for the circuit, which battery and circuit are independent of the other circuits employed in the machine.

There is no essential difference between the method of taking my tension tests and compression tests, the mechanism employed therefor being the same; but in tension tests I place the specimen between the entablature 1 and the screw-actuated movable head 8, it being retained therein by the jaws 2 and 2', while in compression tests the specimen is held between the said movable head 8 and the table 4, Fig. 14 showing the position of the specimen in and during the latter test.

Figure 9:
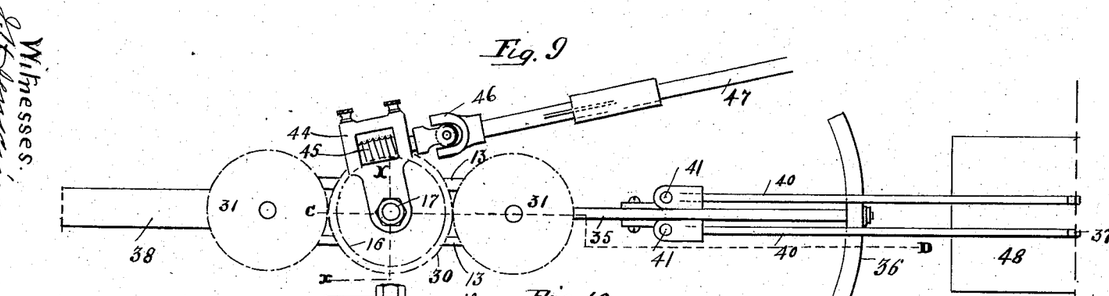
Fig. 9 is a plan of the cog-wheel which actuates the micrometer-screws.

11, Figs. 1, 2, 10, and 14, is a cross-bar carried by two of the entablature-supporting posts 3 3. This cross-bar has two upward medial extending projections 11'. These projections carry on their upper side or end a V-shaped depression $11^2$. (See Figs. 10 and 13.) On this cross-bar my automatic autographic actuating mechanism is supported. The aforementioned V-shaped depressions of the upward-extending arms 11' form the seat for the two knife-edge pivots 12 12. (Best shown in Figs. 1, 10, and 13.) These knife-edge pins or pivots are rigidly fixed to the frame 13 13. (Best shown in Fig. 13.) The frame, of which 13 13 are the lateral walls, consists of these walls in connection with two uniting transversely-located members. (Shown at dotted lines $13^2$ $13^2$, Fig. 10.) These uniting members can be fixed to the aforesaid lateral walls or plates in any rigid manner. They form a support for the gears 31, each end piece supporting one of said gears. 35 is the finger or caliper carrying arm. The arm or blade 35 is rigidly supported to the frame 13 13 or integral therewith. It is, in fact, part of the said frame. It carries the calipers 40 40, Figs. 9 and 10. These fingers are pivoted laterally to the arm 35 at 41 and have an intermediate retainer 36. This retainer can carry the said calipering-fingers in any practical way permitting of their horizontal oscillation, and while I show in the drawings the retainer as round and the fingers having holes therein and these holes adapted to have the retainer pass therethrough I do not want it understood that I limit myself to this structure. By the use of two fingers I can spread the same over the specimen-ring in a manifestly convenient manner, thereby facilitating and rendering more efficient the function of testing.

Figures 10, 11, 12, 13:
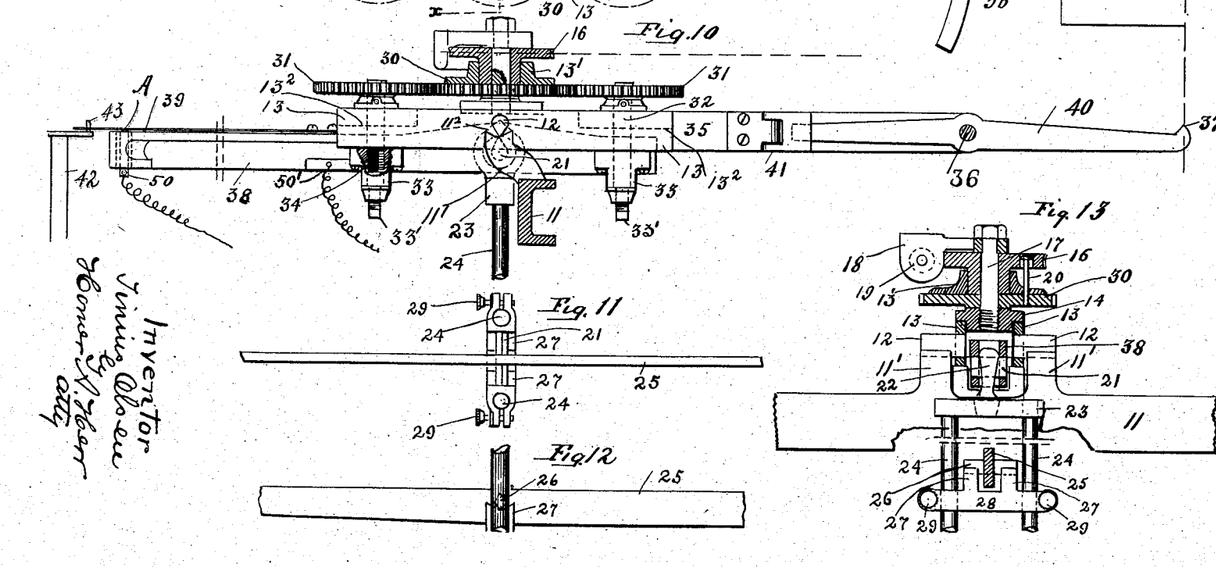
Fig. 10, a side elevation thereof and part vertical section through the line C D, Fig. 9.
Fig. 11 is a plan of the supporting means for the lower calipering-arm.
Fig. 12, a side elevation of this support.
Fig. 13 is a part rear elevation of the support for the micrometer-screw caliper-actuating means and part vertical section on the line $x\ x$ of Fig. 9.

38 is a longitudinal bar supported by the micrometer-screws 34, only one of which is shown, however, in section, Fig. 10. This bar can be lowered or elevated by said micrometer-screws through their actuating-gears 31 31, intermediate 30, worm 45, worm-gear 16, shafts 47 and 47'. This longitudinal bar carries the electrical contacts A, Figs. 1 and 10, in the circuit between the line conductors 50 and 50', 39 being a resilient or spring section in the circuit. 33 33 are two cross-bars, also part of the frame 13. These cross-bars carry adjusting-screws 33', one screw for each frame. On these screws the said micrometer-screws are supported. The frame 38 carries the lower calipering-arm 25 and the fingers thereon, 40', from pivot 21, stirrup 23, rod 24, and cross-bar 28. This cross-bar 28 is adjustable vertically and is clamped to rods 24 by screws 29. The manner in which said lower calipering-arm is carried by said frame is best illustrated in Figs 11, 12, and 13. By the adjustable feature of the cross-bar 28 on the rods 24 I can adapt same to variable lengths of specimens. Once firmly set and clamped, however, it is evident that as the rods are moved vertically the cross-bar 28 will move with them. 27 27 are two upward-extending lugs carried by the said cross-bar. On their upper edges these lugs have V-shaped knife-edge depressions, and these depressions form the seat for the knife-edge pivotal pins 26, carried by the bar 25. Now as this bar 25 is the supporting member for the lower calipering-finger 40' when the rods 24 24 are vertically actuated it follows the horizontal plane of the calipering-finger 40' is changed.

Figures 2, 17:
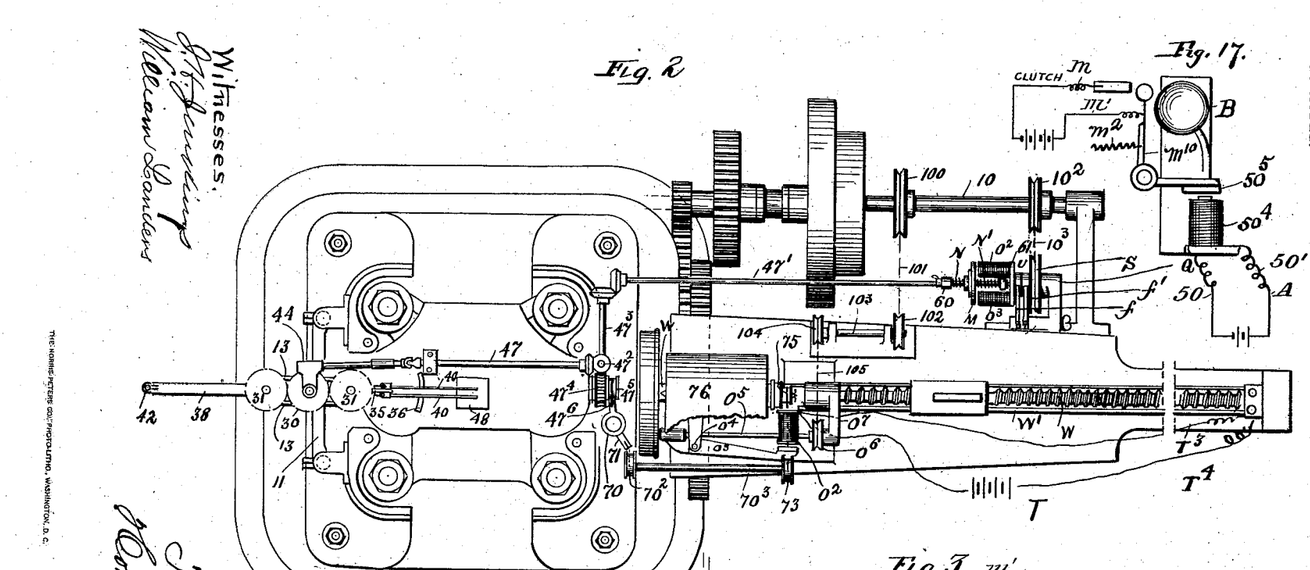
Figures 3, 4:
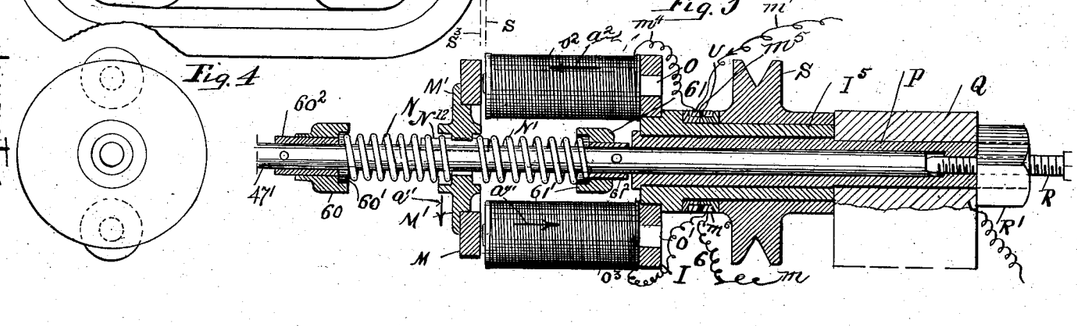

I have now described the structure of my micrometer device, and before describing the electrical features of this device for rendering it automatic I will first describe my magnetic clutch, which is shown in Figs. 1, 2, and 3, but best illustrated in longitudinal section, Fig. 3.

47' is a shaft carrying an armature M. The said shaft is normally at rest.

60 and 61 are two adjustable spring-retaining collars having annular spring-retaining, shaft concentric, spring-seats 60' and 61', respectively. The adjustable spring-retaining collars are threaded to sleeves $60^2$ and $61^2$, whereby their adjustment is determined, and these sleeves are pinned to the shaft, as shown in Fig. 3.

M' is a shaft concentric support for the armature M. This support is free to move longitudinally on the shaft; but it is normally held in a fixed position by the counteracting or counterbalancing springs N and N'.

O and O' are two cores each of which carries its respective magnetizing-coils $O^2$ and $O^3$.

P is a stud-sleeve on which the sleeve $I^5$ rotates, carrying the wheel S and the magnetic field-supporting collar $I^6$; also the collector-contacts V.

Q is a bearing for the one end of the stud P and through this intermediary shaft 47'.

R' is a retaining-nut for the stud P, and R is an adjusting and endwise-retaining screw for shaft 47'.

Now the belt-wheel S is actuated by the belt-wheel $10^2$, Fig. 1, of the prime shaft 10. This wheel S is continuously rotating and with it continuously rotates the field $O^3$ $O^2$ and the support therefor, the shaft 47' remaining normally stationary, as already described. The moment the collectors (not shown in Fig. 3, but shown at $f$ $f'$, Fig. 2) transmit a current to the coils the magnetism thereby induced attracts the armature M against the adjacent poles of the field and moves the said armature from the line $S^3$ to $S^2$, Fig. 3, whereupon the said shaft 47' rotates with the field while the circuit remains closed. Immediately on the circuit being broken the cores losing their magnetization permit the spring N' to force the armature M back again to the line $S^3$, when the shaft 47' will be arrested against further rotation for want of a means to actuate it. The armature-support M' is held to the shaft N by the spline $N^{12}$ and is free to move longitudinally on the shaft while the shaft is stationary, but rotatively they move together. The effect of the said shaft 47' moving rotatively in the manner described is to actuate the vertical shaft $47^2$ through connecting bevels therefor, (shown in Figs. 2 and 14,) shaft 47, worm 45, worm-gear 16, medial spur 30, shaft $47^3$, micrometer-gears 31 31, and micrometer-screws 34, on which is carried frame 38, and finally the calipering-finger support 25, as has already been described or referred to. The movement of the frame 38 with its arm 25, as described, would be downward and the frame 13 13 with the micrometer-screws 34, gears 31 31 30, and worm 16, arm 35, calipering-fingers remaining stationary and in a horizontal plane, and any deviation that takes place in the parallelism of the upper and lower calipering-arms, caused by the distortion of the specimen, will break the contact at A. When so broken, however, the magnetic clutch by operating the gears and micrometer-screws, as has been explained, will automatically again close the circuit. Two currents are employed between the contact A and the magnetic clutch, one light, having its wires 50 and 50', Figs. 1 and 10, carried by the instrument and in which circuit is introduced an ordinary tap-bell B, Fig. 1, and a stronger current for the magnetic clutch, the said tap-bell acting as the switch for this latter current. The details of the electrical circuits at the tap-bell are shown in Fig. 17, where the magnet $50^4$, controlled by the circuit 50 50', attracts the armature $50^5$ and therethrough the bell-arm $M^{10}$ when the circuit is closed at A. The bell-tap striking the bell opens the magnetic-clutch circuit M and M', through which the micrometer adjustment is actuated. The caliper-finger-supporting arms are rigidly held to the frame, whose sides are indicated or shown at 13 13, Figs. 9, 10, and 13, and the micrometer-screws, of which there are two, are held in housings placed between the two said frames 13 13. The arm 38 is supported by these two screws and into it the two said screws are threaded. Therefore as the screws are rotated by the action of the magnetic clutch in the manner and by the connections already described the arm 38 is lowered and the horizontal planes of the said arm 38 and the caliper-supporting-finger arm 35 are varied. This variation in practice is very little before the circuit at A is broken—as little as one twenty-thousandths of an inch. Whatever it is, however, it compensates for the movement of the calipering-fingers—that is, their spread—caused by the distortion of the specimen. Thus is the contact at A opened and closed. The distortion of the specimen breaks the contact at A, and this is done by widening the parallelism of the bar 58 and the calipering-arm 25, as described, and the operation of the clutch, already fully described, makes this contact by restoring this parallelism to normal. It will of course be manifest that the calipering-arms themselves do not return to normal state of parallelism; but this parallelism is widened to a degree corresponding to the distortion of the specimen. In further reference to the circuits by which these ends are in part accomplished Fig. 18 shows the two circuits I employ. The breaking of the contact at A opens the circuit 50 and 50', whereupon the armature $50^5$ is released from the magnet $50^4$ immediately the action of the spring closes the circuit $m\ m'$ by pulling the bell-tap in contact with the $50^7$. Thereupon the magnetic clutch is actuated and through the connecting mechanism already described the micrometer-screws are rotated and the circuit 50 50' again closed by the contact A. In practice these circuits are opened and closed in rapid alternation, so that the bell keeps ringing continuously and so continues until the specimen is tested to destruction or for some other reason the test is discontinued. The spring $M^2$ withdraws the armature from the magnet when the circuit is broken.

In Figs. 1 and 2 I show how I preserve and record the amount of deformation. As the shaft $47^3$ is actuated the worm and worm-wheel $47^4$, through the intermediaries shown and already described, is actuated. This worm-wheel shaft carries a band-wheel laterally. (Shown only in Fig. 2.) This band-wheel carries a metallic tape of flexible quality, $47^6$, Fig. 2 only, and secured to the said wheel $47^5$ at one end and to the collar 70, Fig. 1, at the other. 71 is an upward-extending projection rigid with the collar 70 of the rod S S and having fixed thereto a flexible unyielding metalic tape 72. This projection, as shown in the drawings, is carried by the collar 70; but this specific structure is not important. It is sufficient for the purpose of my invention that the vertical rod S S should actuate the tape, (indicated by the dotted line 72,) and thereby the previously-detailed elements for the purpose stated. The rod S S has a rectilinear vertical motion and is held in suitable guides, one of which is shown at the lower end thereof and the other of which is omitted from the drawings. The collar 70, already noted, is fixed to the rod S S, and as the tape $46^6$ (shown only in Fig. 2) is fixed to the band-wheel $47^5$ at one end, at the other to the collar 70, it is seen that the metallic tape is thus secured in vertical alinement with the moment of stress, and it follows that when the worm is rotated the rod S S is raised vertically and through the elements to be described the recording-drum 76 is rotated. Fig. 18 illustrates this clearly in connection with Figs. 1 and 2. This tape is attached to and rotates the wheel $70^2$ and therethrough the shaft $70^3$.

73 is a tape-carrying wheel of like character to $70^2$. To it is attached the metallic tape, (shown in dotted lines 74, Fig. 1,) whereby the wheel 75 of the impression-receiving cylinder 76 is actuated. This impression-receiving cylinder is covered by a section-lined paper, (not shown,) whereon the impression is made by the pencil actuated axially by means yet to be described to indicate the stress of the specimen, and the said cylinder is rotated by the instrument by or through the rod S S and the connections between the cylinder and this rod already described to indicate the distortion of the specimen. In practice the parts are so constructed that the distortion of the specimen is magnified on the paper by the instrument five hundred times.

In Fig. 15 I show a small detail removed from the rest of the machine of the paper cylinder-support 76, the needle 76' for indicating on the paper, and the magnets $76^2$ for actuating said needle. These magnets are controlled, preferably, by an independent battery $1^B$. This Fig. 15 is substantially a section on line C D of Fig. 1 looking in the direction of the arrow. I do not claim anything new in this needle *per se*, but show it as being correlated with my present invention. Suffice it to say that the needle-holder moves longitudinally through the action of a finely-threaded screw, (not shown,) holding it operatively to the poise-actuating screw W. It is of course evident that the finger-carrying arm $76^7$ oscillates on the screw W and is controlled in this oscillation by the magnet $76^2$ through an electrical current carried by the conductor $76^8$. The intermittent current gives to the needle a rapidly-intermittent stroke, as is usual in like mechanism. The finely-threaded screw S S S is actuated by the screw W, of which it is practically but a part, and the screw W is actuated by the prime shaft 10 through the connections shown in Fig. 1 of the drawings, but not described in the specification further than the reference here made thereto. These parts are so old and well known that a minute detailed description thereof is needless. The recording-needle is driven in proportion to the poise or the motion of the poise, from the fact that its pivotal support $76^7$ is threaded to the above-named finely-threaded screw in the well-known manner in which rotating screws transmit rotary into rectilinear motion. The electromagnet $76^2$ adapts itself to its variably-positioned oscillating function by its armature $76^8$, having a length adapted to this requirement. An end view only is shown of this needle and screw and the needle-armature.

The position of the testing apparatus, as already described, is for tension tests where the specimen S' is to be drawn asunder. At least, the force-lines of stress tend in the direction for this result. To accommodate the calipering-fingers, therefore, I provide the specimen with heads C C. These heads C C are fastened to the specimen and rest the V-shaped end of the lower calipering-arm on the top of the head C, using a weight W to positively retain it thereon, and place the V-shaped finger end of the upper caliper-finger on the under side of its head or collar C, using a weight W' to retain it thereon. As has been noted and described, the bar 35 is pivotally supported by the arms I I' of the frame-piece I I, which latter is fixed to the framework of the machine. The micrometer-screws 34, previously described, support the bar 38, and the bar 38 supports the lower calipering-arm 25 and also all the intermediate connections between the bars 25 and 38. The rods 24 are pivotally supported to the bar 38 through the bar 23 and the knife-edge 21, all of which has already been more in detail described. It will be seen that the pivotal support for the bar 35 and the rods 24 are on the same vertical plane; but they are entirely independent of each other, the rods 24 being free to move vertically, but the part 35 remains stationary. The cross-bar 28, which is the support for the calipering-arm 25, can be placed up or down according to the length of the specimen to be tested, and it is then clamped to the said rods by the screws 29, Figs. 1 and 13. The rods 24 are guided by the frame of the machine, suitable guide-holes being provided in the plate 4 thereof for this purpose.

42, Figs. 1 and 14, is a rod carried by the arm 25. This rod is a circuit-breaker and controls the action of the bell by the means set out and, to recapitulate, in such a manner that the circuit is normally closed; but any slight increase in the length of the specimen while tests are in progress will slightly oscillate the arm 25, and thus break the contact at $e^2$. The micrometer-screws will then again operate and lower the frame or bar 38 and the circuit is again made for the tap-bell. The parallelism of the bars 38 and 25 is thus constantly maintained as long as the specimen is under test, and in practice the circuit is broken so continuously that the bell is in constant jingle.

For compression tests the action of the machine is the same as for tension tests. I, however, change the position of my fingers. The recording of the distortion under these latter tests on the section-lined paper carried by the cylinder is substantially the same as the former. The only difference in taking compression tests from tension ones is the difference in the arrangement of the fingers forming the calipers, which have their position reversed.

Fig. 14 shows the micrometer device and the position of the parts during compression tests. The specimen S, it will be seen, is located on a block $B^5$, supported on the table 4. A depending block or specimen retainer 8' is supported by the movable head 8. This latter block engages the specimen at its upper end. C' is a collar near the lower end of the specimen, as shown, and $B^4$ is a connecting-rod between the said collar and the upper calipering-arm. $C^2$ is a collar or head carried on the upper end of the specimen, and this is the supporting member for my calipering-finger 40' with its arm, &c. The arm 25 I slide down on its rods 24 24 and give it its parallel adjustment. The remaining portion of the mechanism is in no wise changed and has been already described.

I will now describe that portion of my invention which relates to the sensitizing of the weighing-beam. This is illustrated more particularly in Figs. 1, 2, 5, 6, 7, and 8.

6 is my primary force-multiplying lever, Fig. 1. It is connected by link 6' with the secondary lever $6^2$, and these connections have the usual knife-edges. These features are so well known that no detailed or extended description thereof is thought necessary.

$6^3$ and $6^4$ are a stirrup and a link connecting the end of the lever $6^2$ with the counterpoise-carrying lever $6^5$. In Fig. 1 the limits of my paper not permitting the drawing of the machine to a proper length I show it broken.

$6^8$ is a rigid portion of the frame of a testing-machine; $6^7$, a standard fixed thereto and projecting upward from the top face thereof. $6^{10}$ is likewise a standard fixed to said base and extending upward therefrom.

W' is an indicator-carrying arm or bar, its function as an indicator being to indicate at a glance the value of a stress in any stage of a test.

The lever $6^5$ is supported by the standard $6^{10}$, Fig. 1 only, by the usual knife-edge pivot $t$. Fixed to the standard $6^7$ in any rigid manner is a projecting lug T, carrying an automatic switch or circuit-breaker $T^2$. This switch controls the opening and the closing of the circuit formed by the line conductors T³ and T⁴ and battery T with the magnet in the circuit presently to be described.

T' is a contact with a plate T² of the switch, and these contacts are of course insulated by mounting them on the insulator T¹⁰. The movements of the lever 6⁵ are controlled by the stress and the counterpoise.

Figure 6:
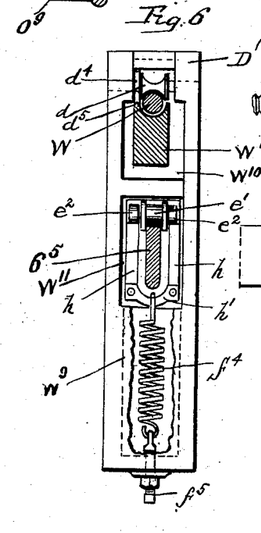
Fig. 6 is an end view of the counterpoising means, the same being partly broken away at its lower cored portion to permit the showing of the poise-spring. This view also shows a transverse section through the poise-actuating screw and counterpoise-carrying beam.
Figures 7, 8:
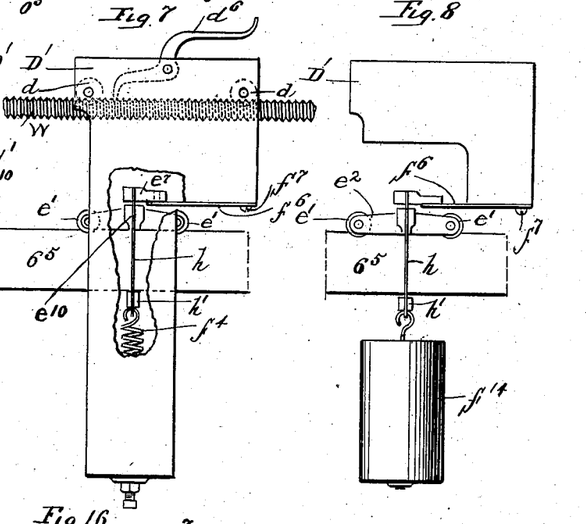
Fig. 7 is a side elevation of the counterpoising means.
Fig. 8 is a modification of said counterpoising means. It consists in substituting for the spring shown in Figs. 6 and 7 a weight.

D' is the counterpoise-carrying frame. (Shown best in Figs. 1, 6, 7, 8.) It consists of a solid casting D', recessed at W¹⁰, as best shown in Fig. 6, and having a cored lower portion, as indicated by dotted lines W⁹, same figure. At its upper portion it carries two rollers $d$ $d$, which serve as guides and supporting-rollers for the entire member and its supports. These rollers are best shown in Figs. 1 and 7. The indicator-bar W' aforesaid is rigid with the standard 6¹⁰ at one end and the standard 6⁷ at the other and serves as a track for the member D'. This track is shown only in Fig. 6, where $d^4$ is a roller rigid with the roller $d$ and lateral thereto. This said lateral roller has a circumferential groove which coincides with the V-shaped track $d^5$ of the bar W'.

$d^6$ is a handle pivotally fixed to the frame D'. This handle controls the locking of the member D', which carries it to the screw W. It is thus seen that the member D' is entirely supported on the fixed bar W' and that the movement of this member longitudinally is produced by the screw W through the locking means therewith carried by the hand-engageable part $d^6$ aforementioned. The weighing beam or lever 6⁵ passes through the intermediate cored portion W¹¹ of the aforesaid poise-carrying member D'. (Shown best in Fig. 6.)

$e'$ $e'$ are a series of rollers carried by the weighing-beam and supported on their frame $e^2$. (See Figs. 6, 7, and 8.) The frame $e^2$ carries two thin metallic strips $h$ $h$, one on each end of the medial line $e^{10}$ thereof. These strips are united at their lower ends by a spring-engageable cross-piece $h'$. They are attached to the medial extension $e^{10}$, Fig. 16 best explaining it, of the roller-carrying frame $e^2$ $e^2$ through vertical slots in said medial extension.

Figure 16:
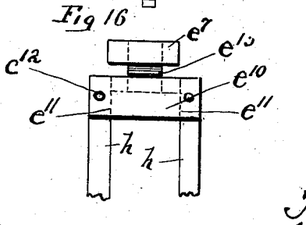
Fig. 16 shows manner in which poise-carriage is connected with its actuating member.

$e^{11}$ $e^{11}$, Fig. 16, indicate the inner wall of the vertical slots for the metallic strips $h$ $h$. The pins $c^{12}$ (shown in Fig. 16) are retaining-pins for the strips $h$. $e^7$ also carries a thin metallic strip $e^{13}$, Fig. 16. This latter strip is carried freely in a vertical longitudinal slot also carried by the medial extension $e^{10}$, before referred to. It is fixed to the lug $e^7$ of the resilient support $f^6$ therefor, which is supported to the member D' by the screw $f^7$. This construction could be modified in various ways, and I do not confine myself to that specifically shown or described so long as the poise-moving member D' actuates my poise longitudinally and the weighing-beam 6⁵ is relieved from the weight of the poise-actuating parts. A structure accomplishing this function would come within the spirit of my invention.

It is evident from the foregoing description that the rollers $e'$ $e'$ and their supported members can have a variable vertical motion without any increased strain on the weighing-beam, as the thin metallic strip $e^{13}$ can play vertically in the slot of the bar or extension $e^{10}$.

$f^4$ is a spring fixed to the cross-bar $h'$ aforesaid at one end and to the tension-adjusting screw $f^5$ at the other. Thus all the weight of the poise-retaining member D' is transferred from the weighing-beam 6⁵ to the arm W', and the only counterpoising elements for my weighing-beam are the weight and tension on the spring $f^4$ and the very limited weight of the parts $h$ $h'$ $e^7$ $e^2$ $e'$, &c., rendering thereby the weighing-beams exceedingly sensitive.

$f^{14}$ in Fig. 8 is a weight and is shown as a modification and equivalent for the spring $f^4$.

Figure 5:
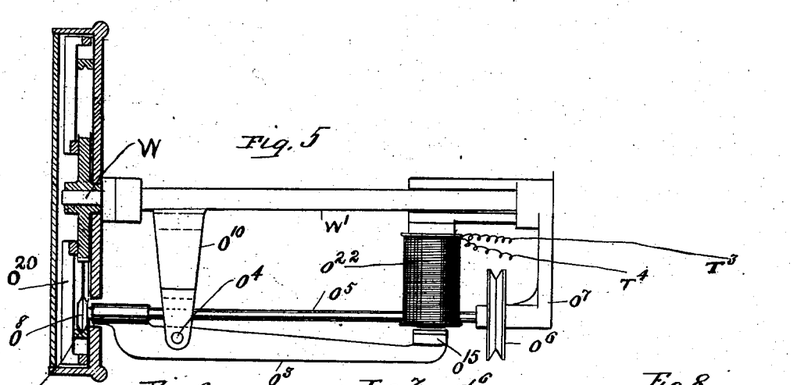
Fig. 5 is a plan of the magnetically-controlled arm for throwing in frictional contact the driver for the poise-actuating screw-disk and a horizontal section through said poise-actuator.

I will now describe the manner in which my weighing-beam automatically regulates the augmenting of its resisting power to stress. This is shown in Figs. 1, 2, and 5.

O²² is a magnet of the usual helix class, with which the circuit or conductor wires T⁴ and T³ are properly connected.

O⁵ is a shaft actuated by the belt-wheel O⁶. O⁷ is a bearing for this shaft at one end. At the other it is supported by the pivoted lever O³, O⁴ being the supporting-pivot therefor. The bearing-supports O¹⁰ and O⁷ are fixed and rigid with the bar W'. They could of course be supported on the standard 6¹⁰. These specific features of structure are not material.

O⁸ is a friction-roller carried by the shaft O⁵. This roller meshes or contacts frictionally with the inner concentric V-shaped groove O⁹. The disk carrying this groove O⁹ actuates the poise-regulating screw W. Therefore when the magnet O²² attracts the armature O¹⁵ of the lever O³ the arm O³ is oscillated, friction-rollers O⁸ and O⁹ are contacted, shaft W rotated, and poise-actuating member D' moved outward from the body of the machine. This outward movement continues until by the increased distance for the rollers $e'$ $e'$ from the pivot $t$ the end of the weighing-beam 6⁵ drops and the point T' is disengaged from the circuit-breaker T², whereupon the circuit being broken the armature O¹⁵ is disengaged from the magnet O² and the screw W is arrested until the stress again closes the circuit at points T' and T², after which the operation is repeated. Thus is the poise-actuating member D' gradually propelled from the lower to the higher registerable values of the indicator until the specimen is broken or until some desired point or degree of stress is ascertained, as the case may be. The finger 76' being actuated longitudinally by the fine-threaded actuating-screw therefor, as already explained, keeps a permanent record of the stress on the aforementioned section-lined paper carried by the cylinder 76.

T in Fig. 1 is a battery, and $T^3$ and $T^4$ are the line conductors of the circuit performing the function just described.

The shaft $O^5$ is in continual rotation and is actuated by the shaft 10, the prime shaft of the machine, through the wheel 100, belt 101, intermediate shaft 103, with its wheels 102 and 104.

I do not limit myself to the specific arrangements of parts or structure set out, but could make numerous modifications without departing from the spirit of my invention.

Having now described my invention, what I claim as new, and desire to secure by Letters Patent, is—

1. The combination in a testing-machine of specimen - distortion - indicating fingers arranged in parallel horizontal planes, a prime shaft, an indicator, means controlled by the distortion of the specimen but actuated by the prime shaft to vary the distance between the parallel planes of the distortion-indicating fingers to a degree corresponding to the distortion of the specimen and means for registering this distortion on the indicator.

2. The combination in a testing-machine of distortion-indicating fingers, means for supporting the said fingers in parallel horizontal planes pivotally, the pivot of the said supports being on the same vertical plane and parallel with the intersecting vertical plane of the specimen at its contact with the said vertical distortion-indicating fingers, a prime mover in the machine, means for distorting the specimen, means for holding the specimen, means for indicating the distortion of the specimen and means controlled by the distortion of the specimen but actuated by the prime mover to automatically maintain said specimen-distortion-indicating fingers in equidistant parallel planes.

3. The combination in a testing-machine of two sets of distortion-indicating fingers arranged in parallel, horizontal planes, a bell, a prime shaft, an upper pivoted frame, one of said sets of fingers carried on said frame, micrometer-screws carried by said frame, a secondary frame, a mechanical connection between said screws and said secondary frame, whereby one of said sets of fingers is supported, a magnetic clutch, an electrical circuit between the bell and the clutch, an electrical circuit between the bell and the finger carried by the said frame, a prime shaft and a circuit-breaker between the said two distortion-indicating arms or fingers.

4. The combination in a testing-machine of distortion-indicating fingers, a prime mover, actuating mechanism for said fingers and a magnetic clutch interposed between said prime mover and said finger-actuating mechanism.

5. In a testing - machine having an automatic poise, the combination of a counter-poise-carriage $e^2$, spring $f'$ attached to the said carriage at one end and at the other to the poise-carriage D, as set out.

6. In a testing - machine having an automatic poise, the combination of a counter-poise-carriage $e^2$, spring $f^4$ one end fixed to the said carriage the other to the poise-carriage D, means for testing the specimen and means for actuating the specimen-testing means as and for the purpose set out.

7. In a testing - machine with automatic weighing mechanism the combination with the weighing-beam $6^5$, counterpoise $e'$, rigid bar W' and member D whereby the said member D actuates the said counterpoise $e'$ on the said beam $6^5$, as and for the purpose set out.

8. In a testing-machine the combination of specimen - distortion - indicating fingers, pivotal means for supporting the said fingers parallel to each other in a plane parallel to the plane through the axis of the specimen, means for transmitting motion to the said fingers, a prime mover, and a magnetic clutch interposed between said prime mover and said finger-actuating mechanism, as and for the purpose set out.

9. The combination in a testing-machine of a frame, duplex micrometer-screws carried by the said frame, a pivotal support for the said frame, distortion-indicating fingers carried by the said frame, means for actuating the said fingers, a prime mover, a second set of distortion - indicating fingers supported by the said micrometer-screws through suitable connections, a circuit-breaker interposed between the said two distortion-indicating fingers, an electrical circuit, a magnetic clutch, said clutch interposed between the said prime mover and the said actuating mechanism for the said distortion-indicating fingers, as and for the purpose set forth.

10. The combination in a testing-machine of a pivoted frame, distortion-indicating fingers carried by the said frame, means for moving the said fingers, a second set of distortion-indicating fingers pendent from the support of the said former set, a prime shaft, an electrical circuit, a magnetic clutch, an electrical switch consisting of a tap-bell, a secondary electrical circuit and a circuit-breaker, said circuit-breaker controlled by the said primary circuit, whereby the said bell forms the switch between the said two circuits and the finger-actuating mechanism is actuated by the magnetic clutch and the said mechanism operates the circuit-breaker in breaking the circuit and the clutch-actuating circuit is closed by the bell, as and for the purpose set forth.

Signed by me at Philadelphia, Pennsylvania, this 23d day of February, 1898.

TINIUS OLSEN.

Witnesses:
HOMER A. HERR,
MARIAN E. DURAND.